Feb. 2, 1932. F. H. BROWN 1,843,442
METERING AND RECORDING THE FLOW OF FLUIDS
Filed March 26, 1923 3 Sheets-Sheet 2
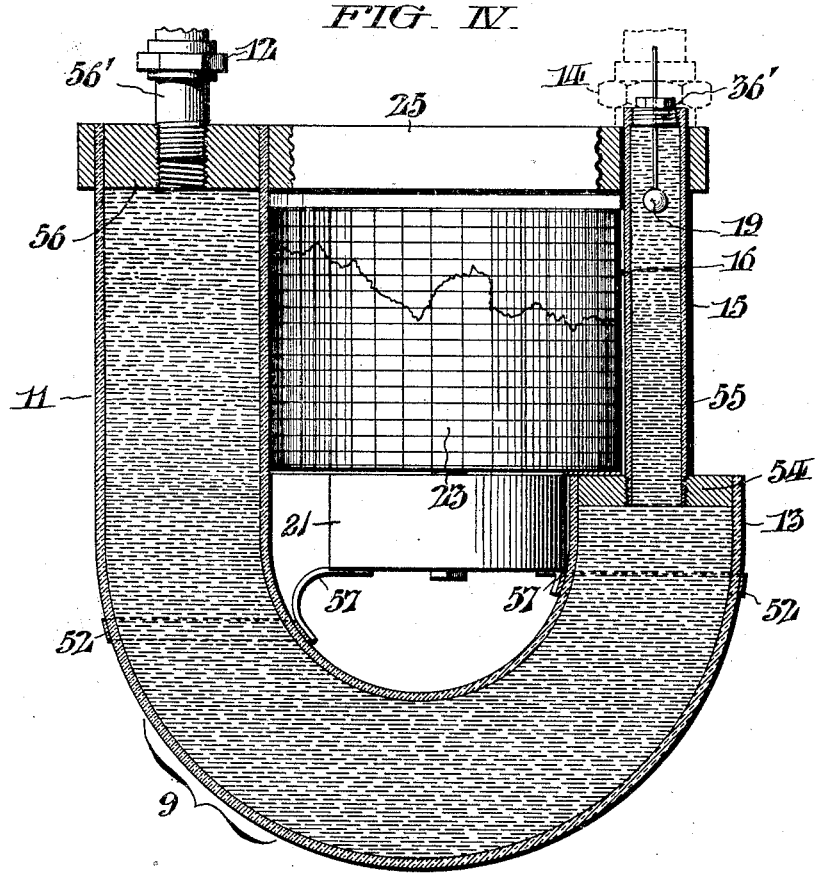
FIG. IV.
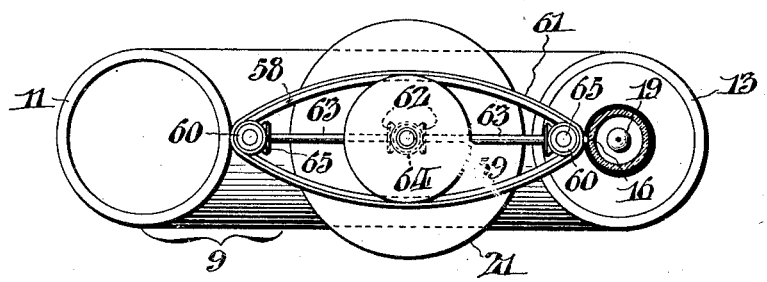
FIG. V.
WITNESSES:
John E. Bergner
Alfred E. Ischinger.
INVENTOR:
Francis H. Brown,
BY Fraley & Paul
ATTORNEYS.

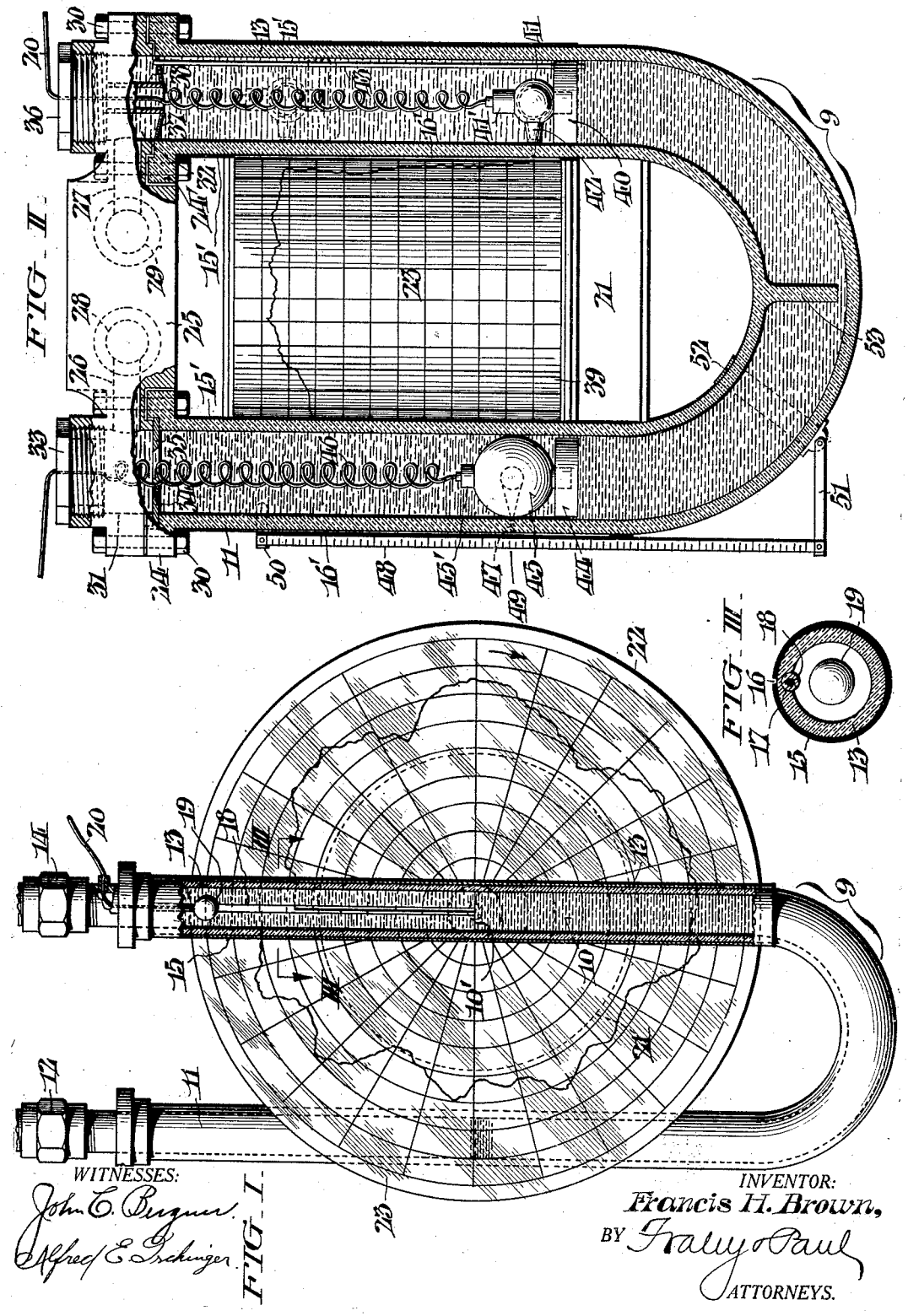

Feb. 2, 1932. F. H. BROWN 1,843,442
METERING AND RECORDING THE FLOW OF FLUIDS
Filed March 26, 1923   3 Sheets-Sheet 3
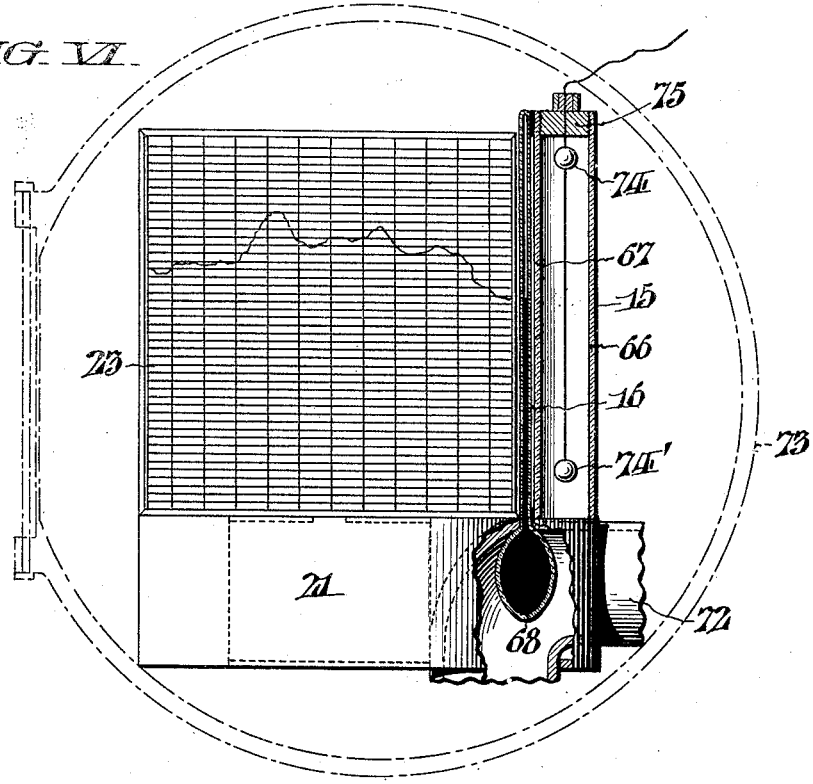
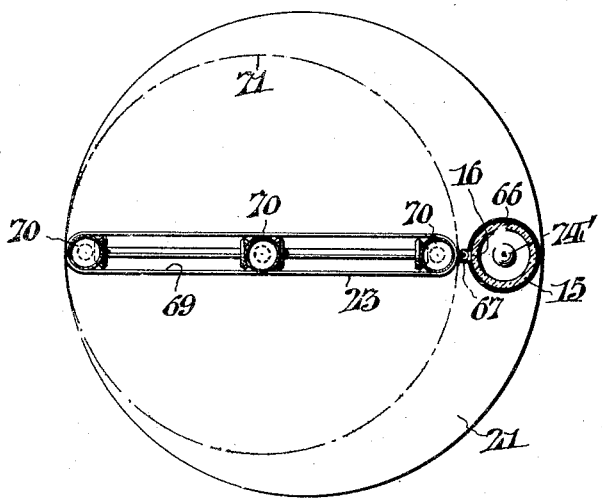
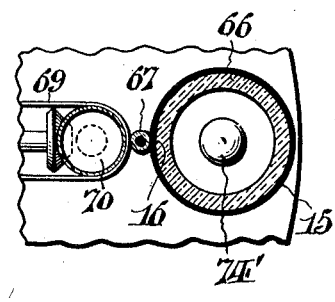
WITNESSES:
INVENTOR:
Francis H. Brown,
BY
ATTORNEYS.

Patented Feb. 2, 1932

1,843,442

UNITED STATES PATENT OFFICE

FRANCIS H. BROWN, OF RIDLEY PARK, PENNSYLVANIA

METERING AND RECORDING THE FLOW OF FLUIDS

Application filed March 26, 1923. Serial No. 627,692.

This invention relates to means for metering and recording the flow of fluids through conduits, mains, pipe lines and analogous conductors, and it has more particular reference to that class of means known as flowmeters, and the like. It is worthy of note that when I refer to fluids, such expression is used in a general sense and is intended to include all kinds of liquids, gases or other substances that yield to any force tending to effect a change in their form.

The primary object of this invention is to provide a measuring, indicating and recording method, means and apparatus wherein there is no friction of moving parts, for measuring, indicating and recording the pressure, flow, movement or other condition of liquids, fluids, gases and the like and changes of temperature, whereby the movements of the measuring element, however produced may be indicated on a scale or its equivalent, and photographed on a recording chart sheet giving positively accurate, free from error results in operation.

A further object of this invention is to provide a novel method and means for metering the flow of fluids, liquids, gases or other analogous elements through a pipe, conduit or other conductor in connection therewith the provision of a novel means or apparatus for photographically indicating and recording the flow of fluids, liquids, gases, variations of pressure, temperature changes and the like therein.

The present invention has for further objects the general improvement of fluid flow metering and recording instrumentalities whereby their efficiency and accuracy are greatly enhanced. Still further my invention aims to provide a strong, simple, durable, and complete flowmeter unit that is extremely sensitive in action, positively accurate and free from error in operation, and thereby attaining a new standard of metering results hitherto impossible.

With the foregoing and other objects in view, as will be more apparent from the following description, this invention comprehends improvements in the method of, and means for metering and recording fluid flows, temperature changes and the like. In addition to the foregoing this invention comprehends improvements in the general arrangement of flowmeter correlated parts and indicating-recording means as hereinafter described and particularly featured by the subjoined claims.

In the further disclosure of my invention reference will be made to the accompanying sheets of explanatory drawings, constituting a part of this specification, and in which like designating characters distinguish the same or corresponding parts in all the views.

Figure I is a front view of a flowmeter embodying one form of my present invention, parts being broken away and in section for a better understanding thereof.

Figure II is a similar face view of a modified form of the invention.

Figure III is a section taken substantially on the line III—III in Figure I.

Figure IV is a face view—partly in section—of a further modified form or type of my novel fluid flow and pressure recorder, more particularly adapted for metering the flow of water, gases, oil or similar liquids and fluids.

Figure V is a sectional plan of the preceding figure.

Figure VI is a face view illustrating the application of my invention to a temperature recording instrument.

Figure VII is a transverse sectional plan of the same; and,

Figure VIII is an enlarged sectional detail of the light tube illustrated in the preceding two figures.

In the embodiments of my invention illustrated I have exemplified, as one convenient and satisfactory shape or form of the container of the pressure variations responisve element, (such as two or more non-mixing fluids as for example mercury and water) a U-shaped tube or manometer but, it will of course, be understood that, any desired, suitable or practical form, shape or contour of container; made of any desired, suitable or practical material, may be employed and that such device and means would fall within the intent and scope of the said invention.

Referring to the drawings in detail and more specifically to Figures I to V thereof, it will be seen that I make use of a U-shaped tube or manometer 9 of appropriate material such as glass, or glass reinforced with metal, or otherwise protected and strengthened. This U-shaped tube or manometer 9 is filled with mercury or other non-mixing fluid 10 to a predetermined extent or level with the remaining superspaces occupied by water; one leg or member 11 for example—of said tube or manometer 9 being connected by a union coupler 12 to the high pressure side of any suitable pressure differential device, not shown. This pressure differential device may comprise an orifice plate or pilot tube suitably mounted in the pipe through which the fluid flows—that it is desired to meter and record. The other leg or opaque member 13 of the U-shaped tube or manometer 9 is joined by a union coupler 14 to the low pressure side of the pressure differential device, and it will thus be clearly apparent to those conversant with the arts to which this invention appertains, that the mercury 10 will be moved in definite accordance with any difference of pressure of the water in the opposite arms or members 11, 13 of the manometer caused by variations in flow. It is noteworthy that in making use of the word "manometer" I desire it broadly construed: that is to say more definitely, wherever I employ said word "manometer" it is intended to include all the many diversified types of instrumentalities with which differential pressure responsive devices are associated for metering and recording the flow of liquids.

Substantially encasing the right leg or member 13 of the U-shaped tube or manometer 9 is a light excluding or impenetratable tubular casing 15 provided with a slot or opening 16 aligning with its longitudinal axis. This slot or opening 16 serves as a light transmitting exit or outlet and for a purpose hereafter explained, while the tubular casing 15 is supported about the manometer leg or member 13 in any appropriate manner ensuring its immovability.

Registering with the aforesaid slot or opening 16, and partially embedded in a longitudinal groove 17 within the leg or member 13, is a relatively fine mercury tube 18 having its lower end open into the main body of mercury 10 at the zero level 10' in the manometer. Thus it will be readily understood that varying pressures acting upon either head of the main body of mercury in the limbs 11 or 13 of the manometer 9 will effect a correlated variation in the height of the mercury column in the fine tube 18. It is noteworthy that by the use of the relatively fine mercury tube 18 I am enabled to obtain more accurate and much finer flow readings; or in other words I adopt the well known principle of volumetric displacement being directly proportional to the area affected. Thus it will be easily understood that, assuming the inner cross-sectional area of the manometer leg 11 is ten times greater than that of the bore in the tube 18 the level of the mercury column in said tube 18 will advance directly proportional ten times the depression of the mercury in the aforesaid leg 11. Hence the graduation markings or calibration readings on the sensitized chart 23 will be accurately and legibly indicated as it will be readily apparent the slightest fluctuation or variation of the mercury level in the manometer leg 11 will be proportionately greater in the tube 18 whereby a clear and positive indication and record of infinitesimal flow variations is assured. By making use of a partly inclined lower section in the tube 18, with a corresponding inclination and formation of the low pressure manometer leg 13, obviously much finer graduation markings can be associated with such inclined portion, in fact, in any desired ratio amplifications of the fine mercury tube 18, and hence the sensitiveness of the device very considerably increased, more particularly with respect to fluctuations or variations from the zero mark or level.

Supported or suspended within the aforesaid leg or member 13 of the manometer there may be placed a stationary illuminating device conveniently an electric light 19 receiving current from any suitable source through a conducting wire 20.

Associated with the manometer or flow meter 9 hereinbefore described is a source of motive power, such as a clockwork 21, the main arbor of which carries a dial 22 adapted to support a removable sensitized chart sheet 23. This chart sheet 23 is properly scaled and graduated to give, time, pressure and other quantitative unit readings by receiving an impression from the beam, ray or ribbon of light emitted through the slot or opening 16 in the above described casing 15, when the lamp 19 is lighted or turned on. Thus it will be easily understood that as the chart sheet 23 is rotated in a clock-wise direction—as indicated by the arrow thereon—with a uniform movement, the beam, ray or ribbon of light from the lamp 19 emitted through the slot or opening 16 above the level of the column of mercury in the fine tube 18, will act upon the sensitized surface of the chart sheet 23. It is noteworthy that the column of mercury in the fine tube 18 obscures the emission of light from the lamps 19 through the slot or opening 16 below its upper level, hence any pressure fluctuations or flow variations acting upon the main body of mercury 10 in the manometer tube 9 will be positively conveyed—as hereinbefore explained—to the fine column of mercury in the tube 18, an accurate record of such fluctuations or variations will be produced and recorded upon the sensitized chart sheet 23; it being obvious that the circumambient surface of said sheet exposed to—and influenced by—the light above the column of mercury in the fine tube 18 will be of a different shade or darkened relative to the inner or central portion, as graphically indicated by the irregular diagram line in the several views.

In the modified form of the invention shown by Figure II it will be noted that the U-shaped or manometer tube 9 is of much larger diameter than that shown in the preceding figure, while the open ends of the legs or members 11, 13 are formed with integral flanges 24. These flanges 24, 24′ constitute a seat for a bridge member 25 having lateral ports 26, 27 to which the usual high and low pressure connections are secured at 28, 29 respectively. Bolts 30, or other suitable fastening means, serve to securely clamp the bridge member 25 in position, while it is to be noted said bridge member 25 is provided with apertures 31, 32 registering with the open ends of the leg members 11, 13 respectively. The aperture 31 it will be observed is closed by a removable plug 33 conveniently screw threaded thereinto, while a diaphragm 34 having a concentric beveled aperture 35 therein is interposed between the joint of the leg 11 with the underside of the bridge member 25 for a purpose hereafter described. Similarly the aperture 32 is closed by a removable plug 36, with an appropriate packing ring 37 interposed between the joint of the counter-bored flange 24′ and the underface of the bridge member 25. The removable plug 36 is fitted with an axially concentric tubular part 38 for a purpose hereafter explained.

The clockwork or other power mechanism 21 is suitably mounted between the tube members 11, 13 and is adapted to rotate a cylinder 39 around which the sensitized chart sheet 23 is disposed in any of the well known ways, while the said clockwork 21 may have associated therewith any appropriate integrating device.

As before described with reference to Figure I, the U-shaped tube or manometer leg member 13 is fitted with a tubular casing, having a longitudinal slot or opening therein; or, said leg member 13 may be coated with any suitable opaque and light impervious substance 15′ with a clear line or non-coated vertical clearance 16′ answering the same purpose. Freely fitting within the leg member 13 and buoyantly supported on the mercury 10 therein is a float 40 having an incandescent lamp 41 mounted thereon. This lamp 41 is enclosed and fitted with a lateral ray-concentrating funnel 42 which serves to direct a beam of light through the opening or clear line 16′ on to the sensitized chart sheet 23, and said lamp receives current by the conducting wire 20. In order to guide the float 40 and retain the concentrated beam of light always in line with the slot or clearance opening 16′, I employ a guide-rod 43 of suitable cross-section that freely traverses a corresponding section aperture in said float, and said rod 43 is conveniently fixed depending from the inner face or end of the removable plug 36.

Similarly I arrange a float 44 in the U-shaped or manometer leg member 11 having an incandescent light 45 mounted thereon and receiving current by a conducting wire 46. This light or lamp 45 is of appropriate pattern to direct a concentrated ray or beam of light 47 on to an indicating scale 48. This indicating scale 48 is appropriately graduated in both directions from the zero point 49 and in order to render said scale 48 adjustable to different zero levels of the mercury 10 I preferably pivot same at its upper end to a link 50 and similarly at its lower part to another link 51, the latter in turn having a similar connection to a clamping strap 52 adapted to securely embrace the tube 9 at any desired location. Any one or more of the aforesaid pivotal connections may be made of a frictional or locking character so that when the scale 48 is properly adjusted to the mercury zero level said scale 48 can be immovably secured.

To prevent swishing of the mercury 10 consequent upon the comparatively larger volume in this form of my flow meter I may provide a baffle or stabilizer 53 substantially central of the bend in the U-shaped tube 9, whereby the sensitiveness of the device can be fully retained.

It is noteworthy at this point to mention the purpose and function of the hereinbefore referred to diaphragm 34, and tubular part 38 of the plug 36; said parts serve as closures in cooperation with the upper cylindric ends 45′ and 41′ of the respective lamps 45, 41 in the event of a "blow-out" in the fluid conducting pipe or line. Thus it will be readily understood that the aforesaid upper cylindric ends 45′ and 41′ when projected into and through the aperture 35 and bore of the tubular part 38 respectively serve as automatic valve closures against loss of mercury if a blow-out or other adverse eventuality transpires.

Referring to the form of my invention shown by Figures IV and V it will be seen that the U-shaped or manometer tube 9 is of what may be more correctly defined as hook-formation, the leg or member 11 being relatively longer than the leg or member 13. In this connection it is worthy of note that where compactness is an essential, or space limited, this form of my invention will be found highly advantageous. The upper end of the leg or member 13 has securely fitted therein a stout washer or ring 54 in the bore of which is conveniently screw-threaded a glass, or reinforced glass tube 55 encased by a slotted casing 15 of the character hereinbefore described, and it is here noteworthy that the inner diameter of the member 11 relative to that of the tube 55 is in the proportion of three to one whereby an amplification of the mercurial rise in said tube 55 is ensured for the purposes heretofore set forth.

The upper ends of the leg or member 11 and tube 55 are appropriately connected into a bridge member 25 while the former is fitted with a reducing insert 56 into which the high pressure connection 56' from the pressure differential device is coupled. The upper end of tube 55 is closed by a removable plug 36'—and low pressure differential connection 14—from which depends the light 19 as described in connection with the form of my invention exemplified by Figure I. The clockwork or other motive mechanism 21 is supported and securely mounted above the manometer bend 9 by clamping rings or straps 52 having a lateral flange bracket 57 of appropriate shape and configuration. In this form of my invention the sensitized chart 23 is arranged, for the sake of compactness, to be travelled about the outer wall of an oval cross-sectional cylinder 58, having a central vertical roller 59 with similar small rollers 60 at its reduced ends the peripheral surfaces whereof align with slots provided for the purpose whereby an appropriate belt 61 driven by said rollers frictionally engages and revolves the said chart 23, as will be clearly understood by those conversant with the art to which my invention appertains. The mechanism for effecting the rotation of the rollers 59, 60 comprises opposed bevel gears 62 on the inner ends of transverse spindles 63 driven by a common intermeshing gear 64 on the main arbor of the clockwork 21. The spindles 63 are fitted with bevel gears 65 at their outer ends in mesh with similar gears at the lower part of the end rollers 60, and it will be quite clear that all the rollers 59 and 60 will have a corresponding direction of rotation to that of the main arbor of the clockwork.

Referring to Figures VI, VII and VIII which illustrate the application of my improvements to a temperature recorder the light tube 66 is of relatively increased thickness and contains a fine tube 67 in its wall having a globular extension 68 filled with any suitable temperature influenced or affectable element such as mercury. The clockwork mechanism 21 for moving the chart sheet 23 may appropriately be of the type shown in Figures IV and V, although the chart sheet 23 and moving belt 69 may be driven by three vertical rollers 70 of equal diameter whereby a very compact recording instrument is provided. On the other hand the chart sheet 23 may be applied to a rotatable cylinder as suggested by the dot-and-dash line indicated at 71 in Figure VII. A fragmentary portion of a steam pipe 72 for example is shown in Figure VI to better illustrate the application of this form of my invention, while the dot-and-dash lines 73 diagrammatically indicate the outline of an appropriate casing for the instrument. One or more lights 74, 74' may be conveniently mounted pendent from the removable plug 75 within the light tube 66 as hereinbefore described.

From the foregoing description it will be perfectly clear to those conversant with the metering and recording of fluid flows, as well as the temperature thereof, that by my invention there is provided an instrument of exceptional accuracy and sensitiveness for recording the minutest variation of the mercury column relative to the sensitized chart sheet 23. Furthermore by the use of a suitably sensitized chart sheet 23 properly scaled and graduated for time, pressure, and any other required quantative units, which will receive an image or impression from the recording beam, ray, or ribbon of light emitted through the slot or opening 16 in the casing 15, by the fixed or movable lights 19, 41 respectively. In similar manner the adjustable indicating scale 48—Figure II—will be illuminated by the floating light 45, through a slot in the opaque cover or casing 15.

The sensitized chart sheet 23 when in use on the flowmeter may, if desired, be protected from the effects of atmospheric exposure and daylight other than the recording beam, ray or ribbon of light passing the slot or opening 16, by enclosing the face of the dial 22 or cylinder 39, 58 carrying said sensitized chart sheet 23 with an amber or other appropriate colored glass or transparent material of opaque character.

The sensitized chart sheet 23 is removed at predetermined intervals of time (usually every twenty-four hours) and immediately immersed in clean water for a few moments, when it will be obvious that an instantaneous and accurate record of the flow conditions taking place will be produced. This phase of my invention is deemed of importance in that there is instantly and permanently produced an accurate record of the variations focused on the chart 23 during the interval of time said chart was in use. In the foregoing connection it is noteworthy that I am not employing or making any claim to the use of photographic development, per se, with its attendant expenditure of time and very necessary attention, but what I do lay claim to is the employment of a sensitized chart sheet capable of instant development in ordinary clean water and having the image record produced thereon in the manner hereinbefore described. Apart from the accuracy of the flow records produced, as hereinbefore set forth, it will be self evident that as a result of their easy development such records can be promptly dried and filed away for future reference with a minimum expenditure of time. Furthermore as a mercury column is the recognized medium for testing and standardizing practically all forms of flowmeters, it will be conceded that my invention results in the provision of a highly sensitive and positively accurate instrument for the purposes set forth. Flowmeters or temperature recorders embodying my improvements being free from any moving parts liable to set up friction or establish lost motion which have to be accounted for in determining actual efficiency will be found, when once correctly calibrated, always free from error thereby ensuring an exact quantitative indication and record of the flow of the element being metered thereby.

In some instances I may dispense with the incandescent lights 19, 41 or 45 and appropriately mount or otherwise locate in the U-shaped manometer tube 9 a small piece of radium or other radioactive element for spontaneously emitting luminous rays capable of penetration through the longitudinal slot or opening 16 or 16' to produce the necessary image record on the sensitized chart.

Finally the embodiments of my invention hereinbefore described and shown are by way of examples only, it being clear that the salient features of said invention may be incorporated in diversified instrumentalities, therefore the right is hereby reserved to make all such changes or variations as fairly lie within the scope of the appended claims.

Having thus described my invention, I claim:

1. In a flowmeter the combination of a transparent U-shaped mercury tube, a relatively fine tube partially embedded longitudinally within one limb wall thereof and having its lower end opening into the mercury at the zero level, a light excluding casing around the limb enclosing the narrow tube and having a longitudinal slot in register with the fine tube, a source of light within the enclosed limb adapted to emit a concentrated beam through the longitudinal slot, a rotatable sensitized chart having the beam of light directed thereon, and mechanism for rotating the sensitized chart relative to the mercury tube.

2. The combination with a pressure differential device of a flowmeter comprising a transparent U-shaped mercury tube, a relatively fine tube partially embedded in the wall of one limb thereof and having its lower end opening into the mercury at the zero level, a light excluding casing enclosing the limb including the fine tube and having a longitudinal slot in register with said fine tube, a stationary source of light within the enclosed limb for concentrating a beam through the longitudinal slot, a rotatable sensitized chart in juxtaposition with the aforesaid longitudinal slot for receiving the concentrated beam of light, and mechanism for uniformly rotating the sensitized chart to produce a flow record.

3. The combination in an indicating and recording composite unit of a U-shaped container with a relatively fine tube partially embedded in one limb thereof, a pressure responsive element therein, means establishing directly-proportional variations in the level of said element, a sensitized chart, means for moving said chart, a concentrated light beam from within the container impinging on the chart, said concentrated light beam in its effective contact on said chart serving to produce a record of the varying levels of the pressure responsive element, such record being a measure of the fluctuations in the means for establishing variations in the level of the pressure responsive element, and means for protecting the sensitized chart against the effects of exposure and the action of light other than that of the concentrated beam.

4. In a meter of the type described the combination of a transparent U-shaped mercury tube, one leg of said tube including a relatively fine mercury-diverting passage, a daylight obscuring means enclosing said leg of the mercury tube, said daylight obscuring means having a longitudinal clearance therein aligned with the mercury-diverting passage, a source of light within the obscure limb for emitting a concentrated ribbon of light through the aforesaid clearance, a movable sensitized surface having the concentrated ribbon of light directed thereon to produce a permanent photographic record.

In testimony whereof, I have hereunto signed my name at Philadelphia, Pennsylvania, this 14th day of March, 1923.

FRANCIS H. BROWN.